(12) United States Patent
Nguyen et al.

(10) Patent No.: US 8,981,929 B2
(45) Date of Patent: Mar. 17, 2015

(54) SECURITY SYSTEM APPLICATIONS FOR LOCATIONS TO BE SECURED

(71) Applicant: Sony Corporation, Tokyo (JP)

(72) Inventors: Andy Nguyen, San Diego, CA (US); Djung Nguyen, San Diego, CA (US); Lobrenzo Wingo, San Diego, CA (US); Frederick J. Zustak, Poway, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/290,862

(22) Filed: May 29, 2014

(65) Prior Publication Data

US 2014/0266710 A1 Sep. 18, 2014

Related U.S. Application Data

(63) Continuation-in-part of application No. 13/430,129, filed on Mar. 26, 2012, now Pat. No. 8,749,375.

(51) Int. Cl.
| | | |
|---|---|---|
| *G08B 1/08* | (2006.01) | |
| *G08B 21/18* | (2006.01) | |
| *G05B 19/418* | (2006.01) | |
| *G08B 25/08* | (2006.01) | |
| *H04L 12/28* | (2006.01) | |
| *H04M 1/00* | (2006.01) | |
| *G08B 13/14* | (2006.01) | |
| *H04W 4/04* | (2009.01) | |
| *H04W 4/02* | (2009.01) | |
| *H04W 4/12* | (2009.01) | |

(52) U.S. Cl.
CPC .............. *G08B 21/18* (2013.01); *G05B 19/418* (2013.01); *G08B 25/08* (2013.01); *H04L 12/2825* (2013.01); *H04L 12/2834* (2013.01); *H04M 1/00* (2013.01); *G08B 13/1427* (2013.01); *H04W 4/043* (2013.01); *H04W 4/023* (2013.01); *H04W 4/12* (2013.01)
USPC .................................. 340/539.13; 340/539.1

(58) Field of Classification Search
None
See application file for complete search history.

(56) References Cited

U.S. PATENT DOCUMENTS

| | | | |
|---|---|---|---|
| 6,377,825 B1 | 4/2002 | Kennedy | |
| 7,124,087 B1 | 10/2006 | Rodriguez | |
| 7,796,024 B2 * | 9/2010 | Lynn et al. | 340/506 |
| 8,749,375 B2 | 6/2014 | Nguyen | |

(Continued)

OTHER PUBLICATIONS

Control your LiftMaster (R) MyQ-enabled garage door opener and house lights from anywhere in the world. Retrieved Jan. 20, 2012, published by The Chamberlain Group Inc., https://play.google.com/store/apps/details?id=com.chamberlain.android.liftmaster.myq&feature=also_installed#?t=W251bGwsMwxLDEwNCwi (10 pgs.).

Non-final office action from U.S. Appl. No. 13/430,129 mailed Oct. 3, 2013.

(Continued)

*Primary Examiner* — Travis Hunnings
(74) *Attorney, Agent, or Firm* — Fitch, Even, Tabin & Flannery LLP

(57) ABSTRACT

A system, method, and computer program product determine when a user's mobile device has left a secured location, such as a house or office, without predefined site security settings being met, and responsively inform the user of any security anomalies. A predetermined distance threshold is compared with the distance between the mobile device, and the secured location. If the distance exceeds the threshold and a trigger event is detected, an alert is transmitted. An alert may also be sent when a mobile object to be secured is moved away from the user's mobile device by a distance that exceeds the predetermined distance threshold.

20 Claims, 6 Drawing Sheets

(56) References Cited

U.S. PATENT DOCUMENTS

| | | |
|---|---|---|
| 2010/0159846 A1 | 6/2010 | Witkowski |
| 2010/0271193 A1* | 10/2010 | Gonzaga ................... 340/457 |
| 2010/0321151 A1* | 12/2010 | Matsuura et al. ............ 340/5.52 |
| 2011/0244928 A1 | 10/2011 | Cherpes |
| 2011/0279270 A1* | 11/2011 | Marckwald et al. ....... 340/545.1 |
| 2012/0022872 A1* | 1/2012 | Gruber et al. ............. 704/270.1 |

OTHER PUBLICATIONS

Notice of Allowance for U.S. Appl. No. 13/430,129 mailed Jan. 30, 2014.

Schlage Link is now Nexia Home Intelligence, Schlage Lock Company, downloaded Jan. 20, 2012; https://play.google.com/store/apps/details?id=com.schlagelink.android&feature=search_result#?+=W251bGwsMSwxLDEslmNvbS5zY2hsYWdlbGluay5hbmRyb2lk110.

* cited by examiner

SECURITY SYSTEM APPLICATIONS FOR LOCATIONS TO BE SECURED

CROSS REFERENCE TO RELATED APPLICATIONS

This application is a continuation-in-part of, and claims the benefit of the priority date of, nonprovisional application Ser. No. 13/430,129, filed on Mar. 26, 2012, which is hereby incorporated by reference in its entirety.

FIELD OF THE INVENTION

This patent application relates in general to security systems, and more specifically to security applications that determine when a user is more than a predefined distance away from a secured physical site or mobile object without predefined security settings being met, and responsively informs the user of security anomalies.

BACKGROUND OF THE INVENTION

Security systems are widely known and have been used for some time. Sensors detect if a physical site, such as a home or office, is undergoing an event that should trigger an alarm. Sensors may detect glass breakage, electricity use or outage, smoke or fire, door openings, and many other events of concern. The security system may then sound an alarm at the site, and/or send a remote alarm signal indicating a security emergency to an external monitoring service, based on the input data from the sensors.

In many instances though, a security issue is not the result of an actual emergency situation, but merely the result of a physical site not being properly put into a predetermined secure condition. A homeowner may leave a house's door open that should be closed, and/or unlocked when it should be locked, or unintentionally leave a light on. Such situations should be brought to the user's attention for possible correction, but should not necessarily trigger an alarm. If the homeowner is still on the premises, there may be no need to put the house into a secured condition, as people are routinely coming and going. The need may arise only when the security system user is away from the house. This patent application provides a viable approach to solving this challenge and presents a practical implementation of that technique.

SUMMARY

A system, method, and computer program product for automating site security are disclosed and claimed herein. An exemplary computer-implemented method embodiment may comprise comparing a predetermined threshold with a distance between a mobile device and a secured site, detecting a trigger event, and selectively transmitting an alert, based on the distance. The distance may be determined by GPS and/or cellular positioning.

The mobile device may comprise a vehicle and/or a mobile device. The secured site may comprise a house and/or an office. The trigger event may comprise a predefined security anomaly, including a movable barrier (e.g a gate, a door, or a garage door) and/or a light being in a condition other than a predetermined condition, such as locked or unlocked, open or closed, and lit or unlit.

The transmitting may comprise communication via the internet. The alert may be formatted as a text message, a phone vibration, a popup alert, a ringtone, an audio recording, a synthesized voice message, an image, and/or a video. The alert may be transmitted to a customer, the mobile device, a home automation cloud service, a security service, and/or security personnel.

The alert may be delivered via a speaker in a vehicle and/or a mobile phone, and an alert format may be selected according to whether the speaker in the vehicle and/or the mobile phone are in use. The method may further comprise acquiring instructions regarding a response to the trigger event from a customer, the mobile device, a security server, and/or security personnel. The instructions may be acquired by detecting a steering wheel pushbutton activation and/or a voice command. The condition of a movable barrier and/or a light may be changed, for example in response to the instructions. The acquired instructions may be executed by a home automation controller running a home automation application. The alert may be transmitted as a subscription based service.

A system embodiment may comprise a processor and a memory containing instructions that, when executed by the processor cause the processor to compare a predetermined threshold with a distance between a mobile device and a secured site, detect a trigger event, and selectively transmit an alert, based on the distance.

A computer program product embodiment may comprise a computer readable medium tangibly embodying non-transitory computer-executable program instructions thereon that, when executed, cause a computing device to compare a predetermined threshold with a distance between a mobile device and a secured site, detect a trigger event, and selectively transmit an alert, based on the distance.

A computer-implemented method for automating security of a secured location according to one embodiment comprises: providing an electronic device at the secured location, the electronic device including an application in communication with at least one sensor adapted to detect at least one trigger event at the secured location; providing an application on a mobile device, the application configured to receive an alert from the electronic device at the secured location; detecting a trigger event at the secured location; comparing a predetermined threshold with a distance between the mobile device and the secured location; transmitting, based on the distance exceeding the predetermined threshold, a signal indicating detection of the trigger event from the electronic device at the secured location to the mobile device; and providing, via the application on the mobile device, an alert on the mobile device indicating the detection of the trigger event at the secured location.

The distance may be determined using at least one of GPS and cellular positioning.

The mobile device may be at least one of a mobile phone and a tablet.

The secured location may be at least one of a house, apartment, condominium, hotel room, commercial building, and office.

The trigger event may be a predefined security anomaly.

The at least one sensor may comprise a camera built into the electronic device at the secured location.

The application of the electronic device may be installed on the electronic device and wherein the application of the mobile device may be installed on the mobile device.

The method may further include displaying on a screen of the mobile device menu options permitting a user of the mobile device to select at least one of the menu options associated with the trigger event at the secured location.

The method may further include, in response to a user selection of the at least one of the menu options on the screen of the mobile device, sending instructions regarding the trigger event from the mobile device to the electronic device at the secured location.

The method may further include executing the instructions received by the electronic device at the secured location from the mobile device.

A computer-implemented method for automating security of a mobile object according to another embodiment comprises: providing an electronic device at the mobile object, the electronic device including an application in communication with at least one sensor adapted to detect at least one trigger event at the mobile object; providing an application on a mobile device, the application configured to receive an alert from the electronic device at the mobile object; detecting a trigger event at the mobile object; comparing a predetermined threshold with a distance between the mobile device and the mobile object; transmitting, based on the distance exceeding the predetermined threshold, a signal indicating detection of the trigger event from the electronic device at the mobile object to the mobile device; and providing, via the application on the mobile device, an alert on the mobile device indicating the detection of the trigger event at the mobile object.

The mobile object may be at least one of an automobile, storage container, shipping container, and camping site.

The method may further include displaying on a screen of the mobile device menu options permitting a user of the mobile device to select at least one of the menu options associated with the trigger event at the mobile object.

The method may further include, in response to a user selection of the at least one of the menu options on the screen of the mobile device, sending instructions regarding the trigger event from the mobile device to the electronic device at the mobile object.

The method may further comprise executing the instructions received by the electronic device at the mobile object from the mobile device.

As described more fully below, the apparatus and processes of the embodiments disclosed enable hands-free home automation applications. Further aspects, objects, desirable features, and advantages of the apparatus and methods disclosed herein will be better understood and apparent to one skilled in the relevant art in view of the detailed description and drawings that follow, in which various embodiments are illustrated by way of example. It is to be expressly understood, however, that the drawings are for the purpose of illustration only and are not intended as a definition of the limits of the claimed invention.

DETAILED DESCRIPTION

Figure 1:
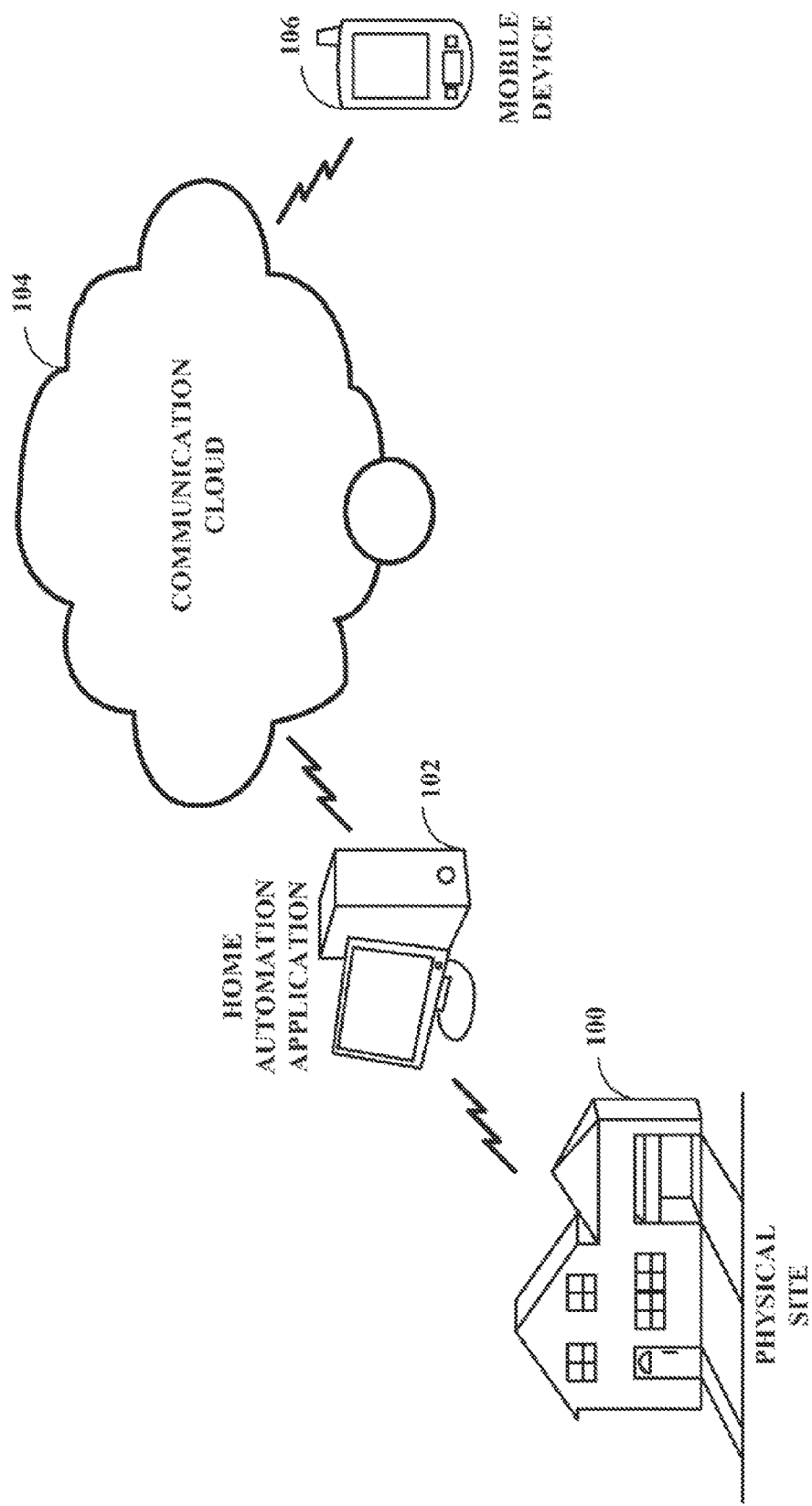
FIG. 1 depicts an overview of the arrangement of a physical site security system, according to an embodiment.

Referring now to FIG. 1, an overview of the arrangement of a physical site security system is shown. A physical site 100 is the premises to be secured, and may include a house, apartment/condominium, hotel room, hospital, commercial facility, or office, or any other physical site as may be conventionally known. A home automation controller may run a home automation application 102. The figure depicts application 102 as being run on a computer, but application 102 may be run by any consumer electronics device, such as a television set, home theater receiver, or Blu-ray player for example. The application may monitor various sensors throughout the premises, and may optionally be able to control the condition of various features of the premises. For example, application 102 may be able to lock and unlock and/or open and close movable barriers such as doors, gates, or garage doors, as well as turn lights on or off. Home automation application 102 is also capable of two-way external communication, preferably via the internet or other communication cloud 104.

Home automation application 102 communicates with mobile device 106, which may comprise a customer's vehicle or mobile phone for example. Mobile device 106 is capable of determining its geographic location through means known in the art, including but not limited to GPS and cellular positioning. Home automation application 102 stores the geographic location of the physical site to be secured in a memory, and compares this location to the location of mobile device 106 to determine a distance between the two. The distance is then compared to a predefined distance threshold. In this manner, home automation application 102 may determine if a user/customer has vacated the premises to be secured 100, or, conversely may determine if a user who had left is now returning.

Home automation application 102 has predefined settings to define various states of the premises that may be sensed by various sensors and optionally controlled, such as all doors closed and locked and all lights off, etc. These settings may be modified by the user as desired. If a user leaves premises 100, as determined by mobile device 106 moving beyond the distance threshold, home automation application 102 performs a test of its sensors to determine if there are any security anomalies. In this manner, home automation application 102 may determine that a user has left physical site 100 without the security settings being properly met, e.g. a door may have been left open or unlocked, etc. Generally speaking, application 102 checks to determine if any predefined security conditions are unmet. If so, and the user is not at the premises, a trigger event occurs.

Home automation application 102 responsively transmits an alert to the user. Note, this behavior differs from prior art security systems which may for example simply trigger an audible alarm and/or call a security service. Such false alarms are frequent and may result in fees charged to a user when there is no real emergency situation.

The alert may be transmitted via the internet to a customer, the mobile device, a home automation cloud service, a security service, and/or security personnel, depending upon settings entered into the application. The alert may be formatted as a text message, a phone vibration, a popup alert, a ringtone, an audio recording, a synthesized voice message, an image, and/or a video. The alert may be delivered via a speaker in a vehicle or a mobile phone, depending on user preferences and on whether such devices are currently in use.

For example, if a user's mobile phone is in use, the user may not appreciate an audio recording from application 102 interrupting a phone call, so a less obtrusive alert format may be selected. Similarly, if a vehicle's stereo speakers are in use, a phone vibration may be a better way to get the user's attention. The system in general attempts to notify rather than alarm a user that a security anomaly has been detected, as it may be more likely that a user simply left the premises somewhat unsecured than that an emergency situation is actually occurring.

Embodiments of the invention may go beyond simply notifying the customer that a security anomaly exists, they may also acquire instructions regarding a response to the trigger event. Such instructions could come from a customer, the mobile device, a security server, or security personnel. For example, instead of being delivered to the mobile device 106 as a text message to the mobile device 106, the mobile device 106 may include a security application installed thereon that would permit the alert to be delivered to the security application on the mobile device 106 and to be displayed on the mobile device 106 as a popup or list of on-screen menu options generated by the security application, permitting the user of the mobile device 106 to select an appropriate instruction to be sent back to the application 102 for responding to the security anomaly. Application 102 may try to contact various alert recipients in order, typically by following a set of hierarchical alert instructions previously established by the customer. For example, the system could be implemented as a subscription service, wherein various levels of alerts and involvement of other parties may be differently priced. Alerts could go to the customer, and if no response is received, then for example a security service could be alerted. A three-way conversation between a customer, security personnel, and application 102 could be automatically arranged for a more detailed investigation of the security anomalies prior to dispatching security personnel to the physical site. Alternately, the user might program embodiments to automatically correct the security anomaly and send an alert to the user as a notice to be more security-conscious in the future.

Embodiments may acquire response instructions by detecting a steering wheel pushbutton activation or a voice command from the user. Even if no alert is sent, application 102 may also enter a listen mode when an appropriate phrase is spoken via the user's mobile phone. In any event, the accepted commands will allow a user to for example check the garage door, locks, and lights as currently open/closed, locked/unlocked, or on/off, etc., and enable the user to change any of these to the state desired. In this way, the security anomaly may be corrected or merely acknowledged in a hands-free manner. Alternately, a user may choose to escalate the security anomaly to a true alarm situation.

Application 102 may also have a set of customizable commands for certain common scenarios. An example would be a "coming home" scenario, which would open the garage, unlock the door, and turn on the lights. This command set could either be triggered by the user's position relative to his or her home address becoming more proximate, or by the user saying the appropriate command via hands-free voice recognition. Application 102 includes encryption and authentication features to ensure that only authorized users or customers may issue commands.

Figure 2:
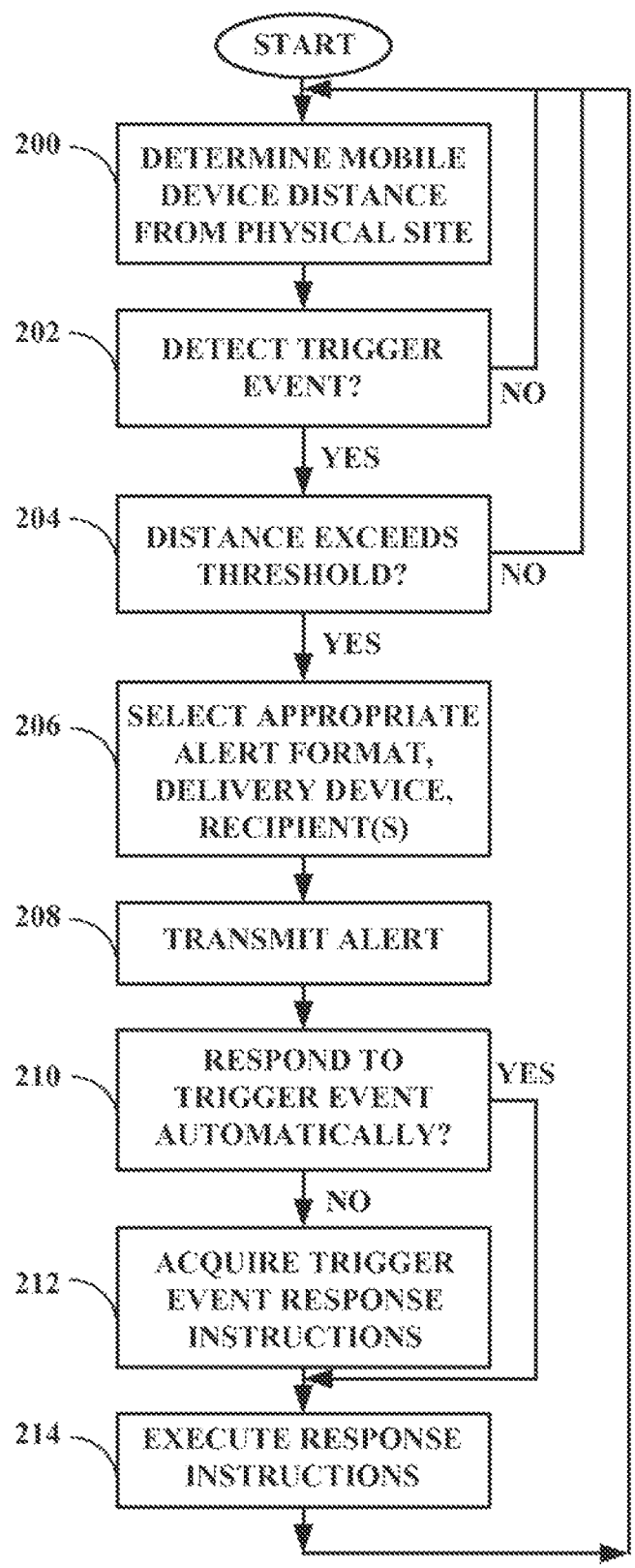
FIG. 2 depicts a flowchart of the operation of a physical site security system, according to an embodiment.

Referring now to FIG. 2, a flowchart of the operation of the security system of FIG. 1 is shown. In this flowchart, the embodiments are presumed to be monitoring a departing user, but it is to be understood that the invention is not so limited. In step 200, application 102 determines the distance between physical site 100 and mobile device 106. In step 202, application 102 determines if a trigger event has occurred, which may for example comprise a security anomaly, and if so proceeds, otherwise returns to the distance determination. In step 204, application 102 determines if the distance between physical site 100 and mobile device 106 exceeds the predetermined threshold distance. If not, then operation returns to the beginning, but if so then an alert is warranted.

In step 206, embodiments process the alert to be transmitted. This includes determining the alert format to be used (e.g. a text message, a phone vibration, a popup alert, a ringtone, an audio recording, a synthesized voice message, an image, and/or a video). The appropriate delivery device is also determined (e.g. a vehicle's speakers, or a mobile phone or other mobile device). Finally, the appropriate recipients are also determined (e.g. a customer, the mobile device, a home automation cloud service, a security service, and/or security personnel). In step 208, the alert is transmitted, preferably via the internet, although other communication means are within the scope of the invention.

Beginning in step 210, the embodiments respond to the trigger event. If a user has for example set home automation application 102 to respond to a trigger event automatically without sending an alert, then operation may move to step 214 to execute the desired response instructions. Otherwise, in step 212 the embodiments acquire response instructions, for example by detecting a steering wheel pushbutton activation and/or a voice command from a user/customer. Finally, in step 214, the response instructions are executed by application 102.

Figure 3:
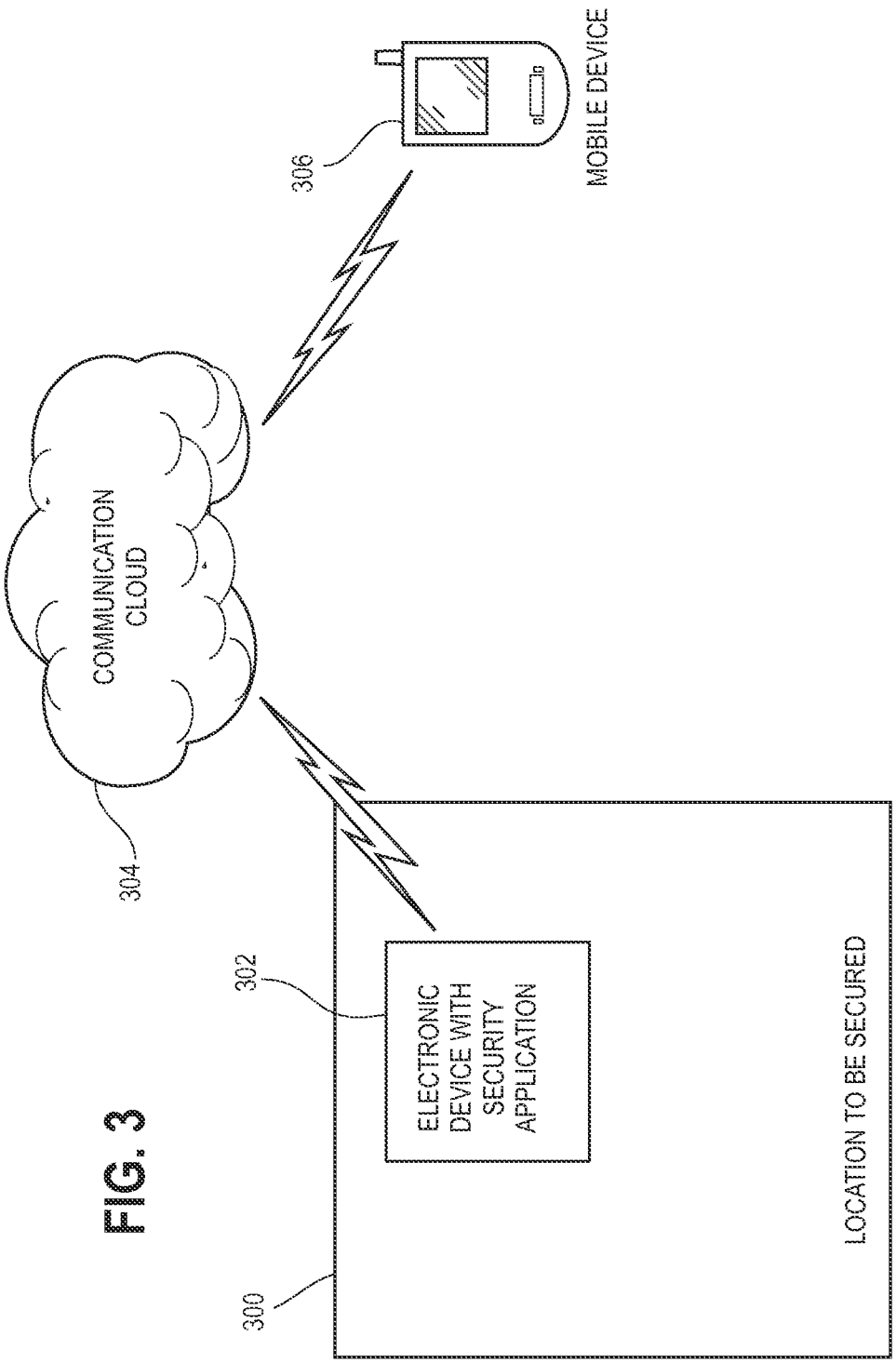
FIG. 3 depicts an overview of an arrangement of a security system at a location to be secured, according to an embodiment.

Referring now to FIG. 3, an overview of the arrangement of an exemplary security system for a location to be secured is shown. The security system as shown in FIG. 3 is similar to the security system of FIG. 1 and may include similar features and may operate in a similar way to the security system of FIG. 1, with some differences highlighted below. For ease of reference, aspects of the system of FIG. 1 that are similar to aspects of the security system of FIG. 3 have been designated with similar reference numbers.

A location to be secured 300 may include a house, apartment/condominium, hotel room, hospital, commercial facility, office, or any other physical site as may be conventionally known. Electronic device 302 at the secured location 300 may run a security application that may be installed on the electronic device 302. It is to be understood that the security application may be optionally launched on the electronic device 302 via an external website instead of via an installed software application. The electronic device 302 (which may be one or more devices) may be a portable electronic device such as a laptop computer, tablet computer, mobile phone, or any other electronic device where the security application may be installed.

Since most electronic devices such as laptops, tablet computers, and mobile phones include at least one built in camera, electronic device 302 may be set up at the location to be secured 300 such that the built in camera of the electronic device 302 monitors the location to be secured 300. For example, the security application installed on the electronic device 302 may monitor detection, by the camera of the electronic device 302, of movement and/or opening and closing of doors and/or windows and/or turning of the lights on/off at the location to be secured 300. It will be appreciated that where the electronic device 302 includes both a camera that faces the user and a camera that faces away from the user, the electronic device 302 may be set up such that the security application of the electronic device 302 monitors any predefined event detected by both of the built in cameras. It is to be appreciated that the electronic device 302 may use a connected external camera instead of the camera built into the electronic device 302.

The security application of the electronic device 302 communicates with mobile device 306, which may be a mobile phone. Mobile device 306 is capable of determining its geographic location through means known in the art, including but not limited to GPS and cellular positioning. The security application of the electronic device 302 provides for storage of the geographic location of the location (e.g., hotel room) to be secured 300 in a memory of the electronic device 302, and compares this location to the location of mobile device 306 to determine a distance between the two. The distance is then compared to a predefined distance threshold. In this manner, the security application of the electronic device 302 may determine if a user has vacated the location to be secured 300, or, conversely may determine if a user who had left is now returning.

The security application of the electronic device 302 has predefined, user-modifiable settings to define various states of the location to be secured 300 that may be detected by the camera of the electronic device 302. Generally speaking, the security application 302 may check to determine whether any predefined security condition that is monitored via the built in camera of the electronic device 302 is unmet. For example, the camera of the electronic device 302 may detect movement, i.e., opening of a door, a person walking inside a room, lights being turned on or off, etc. If so, and the user is further than a predefined distance away from the premises, a trigger event occurs. The security application of the electronic device 302 is configured to responsively transmit an alert to the user (e.g., to a user's mobile phone) if a trigger event occurs.

The security application on the electronic device 302 communicates via a communication network or cloud 304 (e.g., internet and/or wireless communication network) with mobile device 306 and/or security and/or emergency personnel, depending upon settings entered into the security application on the electronic device 302. The alert sent from the electronic device 302 to the mobile device 306 may be formatted as a text message, a phone vibration, a popup alert, a ringtone, an audio recording, a synthesized voice message, an image, and/or a video.

The mobile device 306 may be a mobile device such as a cellular phone or tablet computer having a security application installed thereon. The security application installed on the mobile device 306 is configured for communication with the security application on the electronic device 302. For example, the security application installed on the mobile device 306 may be configured to receive alerts (e.g., based on predefined trigger events) from the security application of the electronic device 302 and to send instructions to the security application of the electronic device 302, or to an external security or emergency service. Preferably, the security application installed on the mobile device 306 may, in response to receiving an alert from the security application of the electronic device 302, generate an on-screen menu with options that permit the user of the mobile device 306 to select an appropriate instruction to send to the electronic device 302 and/or other action (e.g., notify police and/or fire department). The security application installed on the mobile device 306 may be identical to, or different from, the security application installed on the electronic device 302.

Figure 4:
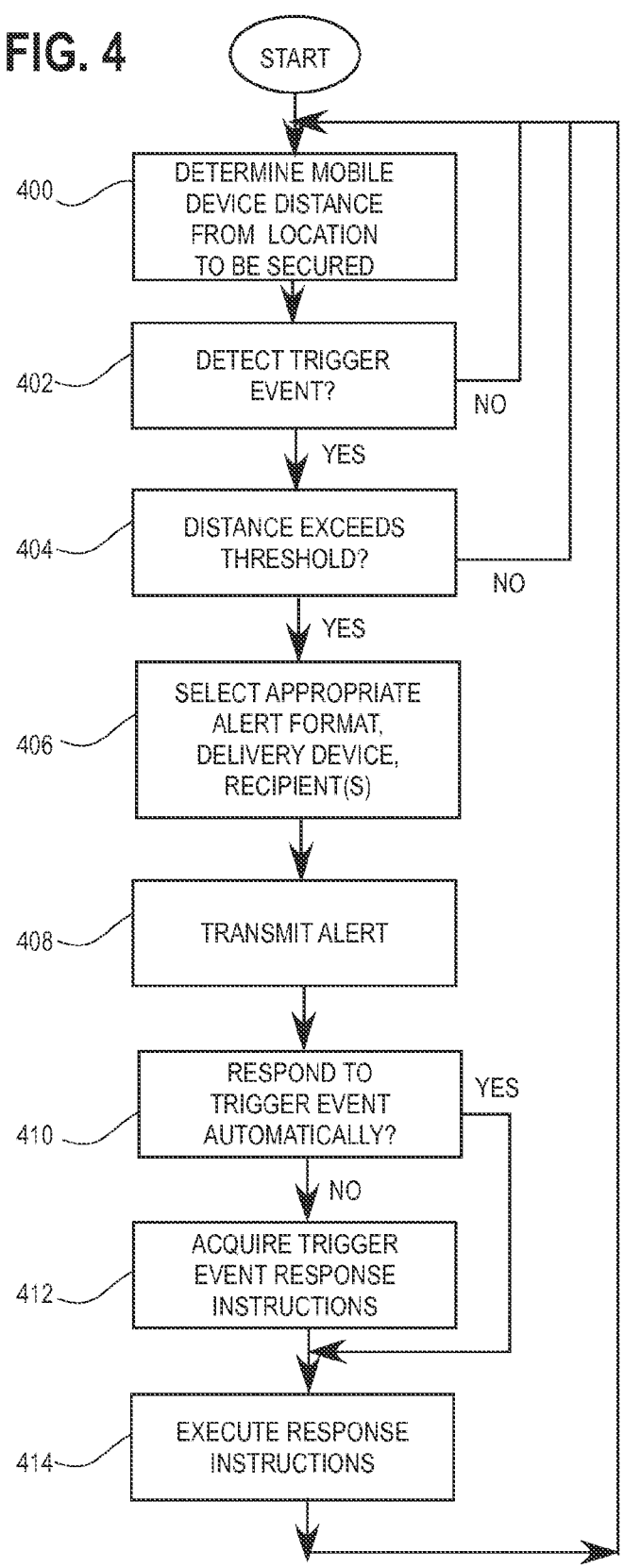
FIG. 4 depicts a flowchart of the operation of the security system shown in FIG. 3.

Referring now to FIG. 4, a flowchart of the operation of the security system of FIG. 3 is shown. While this flowchart depicts monitoring a departing user, it is to be understood that the security system of FIG. 3 could similarly monitor an arriving user. In step 400, the security application on the electronic device 302 determines the distance between the location to be secured 300 and mobile device 306. In step 402, the security application on the electronic device 302 determines if a trigger event has occurred, which may for example comprise a security anomaly such as someone walking in a room or an opening of a door, and if so, proceeds, otherwise returns to the distance determination. In step 404, the security application on the electronic device 302 determines if the distance between the location to be secured 300 and the mobile device 306 of the user exceeds the predetermined threshold distance. If not, then operation returns to the beginning as shown in FIG. 4, but if so, then an alert is warranted.

In step 406, the security application on the electronic device 302 processes the alert to be transmitted. This may include determining the alert format to be used (e.g. a text message, a phone vibration, a popup alert, a ringtone, an audio recording, a synthesized voice message, an image, and/or a video). The appropriate delivery device is also determined (e.g. a mobile phone or other mobile device). Finally, the appropriate recipients are also determined (e.g. a mobile device, a security service, and/or emergency personnel). In step 408, the alert is transmitted via communication cloud 304, which may include the internet or any other wired or wireless communication means.

Beginning in step 410, the security application on the mobile device 306 receives the respond to the trigger event and, preferably, an on-screen menu is generated on the mobile device 306 to present the user with option for selecting instructions to be sent to the electronic device 302 for responding to the trigger event. It is to be appreciated that if a user has set the security application on the electronic device 302 to respond to a trigger event automatically without sending an alert, then operation may skip to step 414 to execute the desired response instructions. Otherwise, in step 412 the security application on the electronic device 302 acquires response instructions, for example, by receiving them from the mobile device 306 in response to the user's selection of an appropriate on-screen menu option. Finally, in step 414, the response instructions are executed by the security application on the electronic device 302.

The security system of FIG. 3 and the method of FIG. 4 advantageously permit a user to easily set up a portable security system virtually in any location desired to be secured (e.g., a hotel room, mobile office, camp site, etc.). The security system of FIGS. 3-4 advantageously does not require an electronic device (e.g., home automation controller), but may be implemented as an application installed on a mobile phone or tablet computer that can be used in many ways other than a security system.

Figure 5:
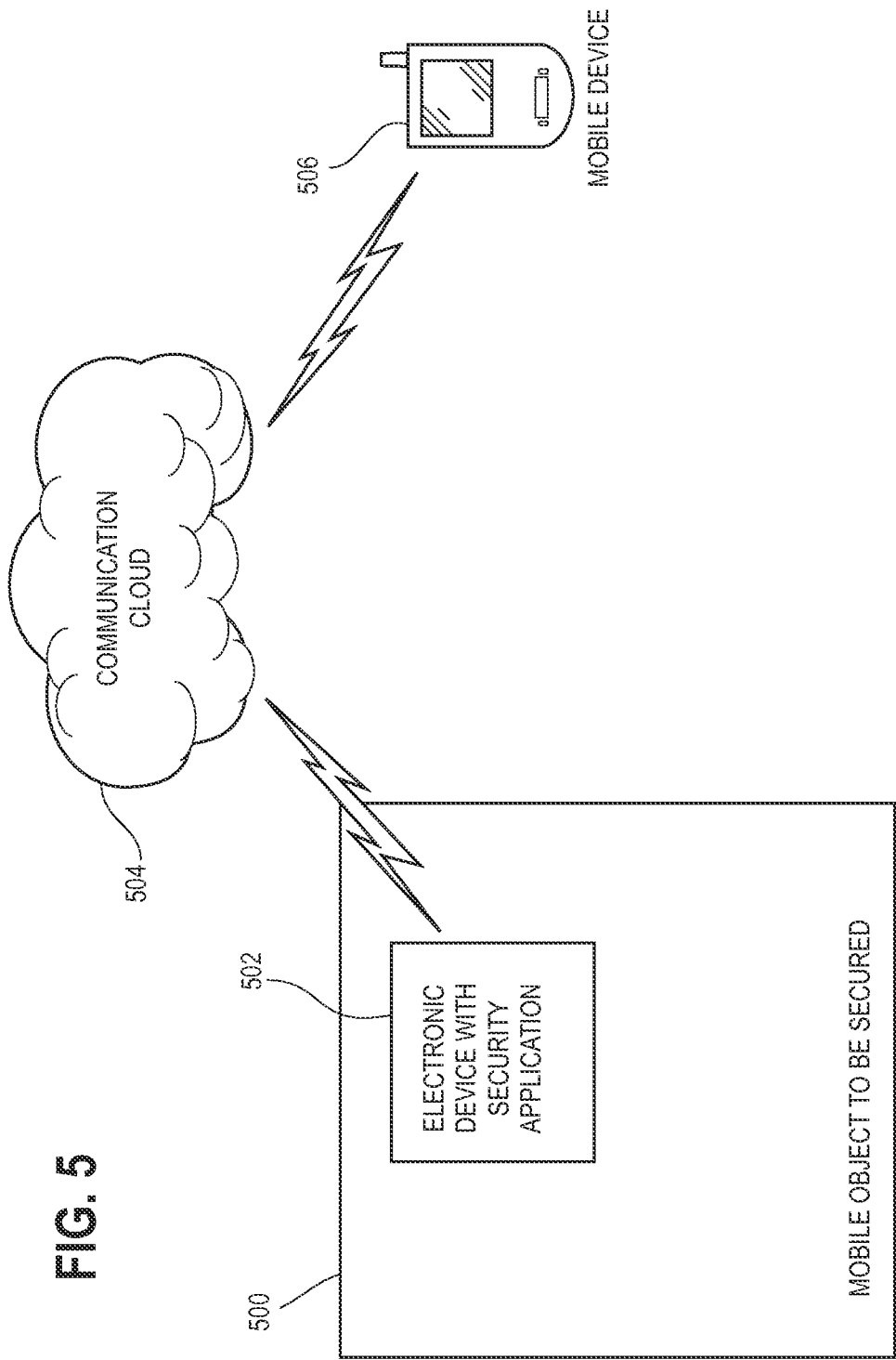
FIG. 5 depicts an overview of an arrangement of a security system for a mobile object to be secured, according to an embodiment.

Referring to FIG. 5, an overview of the arrangement of an exemplary security system for a mobile object to be secured is shown. The security system as shown in FIG. 3 is similar to the security systems of FIGS. 1 and 3 and may include similar features and may operate in a similar way to the security systems of FIGS. 1 and 3, with some differences highlighted below. For ease of reference, aspects of the system of FIGS. 1 and 3 that are similar to aspects of the security system of FIG. 5 have been designated with similar reference numbers.

A mobile or transportable object to be secured 300 may include an automobile, cargo container, a safe, or any other mobile or transportable object desired to be secured. Electronic device 502 at the mobile object to be secured 500 (e.g., on the exterior or in the interior of a car or a cargo container) may run a security application that may be installed on the electronic device 502 that preferably includes a built in camera that monitors the mobile object to be secured 500.

For example, the security application installed on the electronic device 502 may monitor detection, by the camera of the electronic device 502, of opening and closing of doors of a car or a cargo container, or movement inside the car or cargo container. Alternatively, the electronic device 502, via the built in camera or another sensor or GPS, may detect movement of the car or the cargo container away from its original location.

As described previously with reference to FIG. 3, the security application of the electronic device 502 communicates with mobile device 506, which may be a mobile phone. Mobile device 506 is capable of determining its geographic location through means known in the art, including but not limited to GPS and cellular positioning. The security application of the electronic device 502 provides for storage of the geographic location of the mobile object (such as a car or cargo container to be secured 500) in a memory of the electronic device 502, and compares this location to the location of mobile device 506 to determine a distance between the two. The distance is then compared to a predefined distance threshold. In this manner, the security application of the electronic device 502 may determine if the mobile object to be secured 500 has been moved from its original location.

The security application of the electronic device 502 has predefined, user-modifiable settings to define various states of the mobile object to be secured 500 that may be detected by the camera of the electronic device 502. Generally speaking, the security application 502 may check to determine whether any predefined security condition that is monitored via the built in camera of the electronic device 502 is unmet. For example, the camera of the electronic device 502 may detect movement within the mobile object to be secured 500, or movement of the mobile object to be secured 500 itself. If so, and the mobile object to be secured 500 is detected to be located further than a predefined distance away from the mobile device 506 of a user, a trigger event occurs. The security application of the electronic device 502 is configured to responsively transmit an alert to the user (e.g., to a user's mobile phone) if a trigger event occurs.

The security application on the electronic device 502 communicates via a network or cloud 504 (e.g., internet and/or wireless communication network) with mobile device 506 and/or security and/or emergency personnel, depending upon settings entered into the security application on the electronic device 502. The alert sent from the electronic device 502 to the mobile device 506 may be formatted as a text message, a phone vibration, a popup alert, a ringtone, an audio recording, a synthesized voice message, an image, and/or a video.

The mobile device 506 may be a mobile device such as a cellular phone or tablet computer having a security application installed thereon. The security application installed on the mobile device 506 may be configured to receive alerts (e.g., based on predefined trigger events) from the security application of the electronic device 502 and to send instructions to the security application of the electronic device 502, or to an external security or emergency service. Preferably, the security application installed on the mobile device 506 may, in response to receiving an alert from the security application of the electronic device 502, generate an on-screen menu with options that permit the user of the mobile device 506 to select an appropriate instruction to send to the electronic device 502 and/or other action (e.g., notify police and/or fire department). The security application installed on the mobile device 506 may be identical to, or different from, the security application installed on the electronic device 502.

Figure 6:
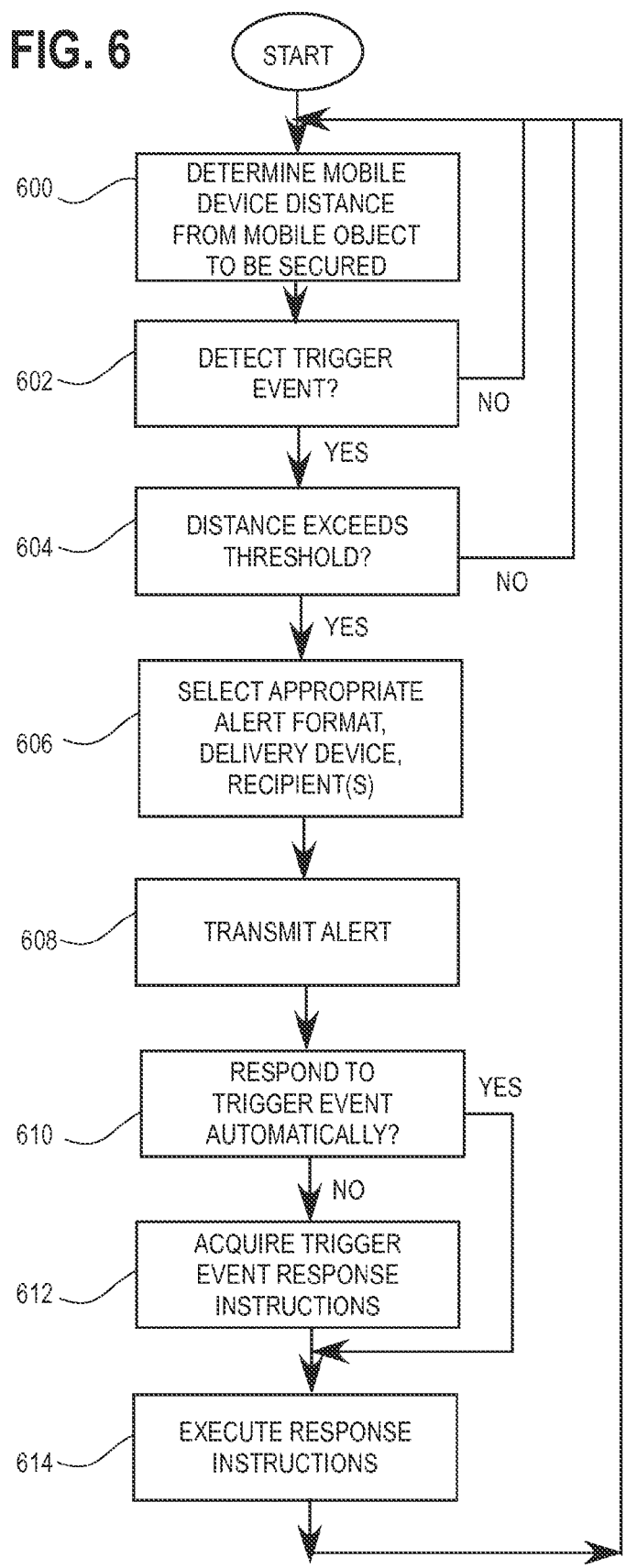
FIG. 6 depicts a flowchart of the operation of the security system shown in FIG. 5.

Referring now to FIG. 6, a flowchart of the operation of the security system of FIG. 5 is shown. In step 600, the security application on the electronic device 502 determines the distance between the mobile object to be secured 500 and mobile device 506. In step 602, the security application on the electronic device 502 determines if a trigger event has occurred, which may for example comprise a security anomaly such as someone breaking into the car or cargo container to be secured or someone moving the car or cargo container, and if so, proceeds, otherwise returns to the distance determination.

In step 604, the security application on the electronic device 502 determines if the distance between the mobile object to be secured 500 and the mobile device 506 of the user exceeds the predetermined threshold distance. If not, then operation returns to the beginning as shown in FIG. 6, but if so, then an alert is warranted.

In step 606, the security application on the electronic device 502 processes the alert to be transmitted. This may include determining the alert format to be used (e.g. a text message, a phone vibration, a popup alert, a ringtone, an audio recording, a synthesized voice message, an image, and/or a video). The appropriate delivery device is also determined (e.g. a mobile phone or other mobile device). Finally, the appropriate recipients are also determined (e.g. a mobile device, a security service, and/or emergency personnel). In step 608, the alert is transmitted via communication cloud 504, which may include the internet or any other wired or wireless communication means.

Beginning in step 610, the security application on the mobile device 506 receives the respond to the trigger event and, preferably, an on-screen menu is generated on the mobile device 506 to present the user with option for selecting instructions to be sent to the electronic device 502 for responding to the trigger event. It is to be appreciated that if a user has set the security application on the electronic device 502 to respond to a trigger event automatically without sending an alert, then operation may skip to step 614 to execute the desired response instructions. Otherwise, in step 612 the security application on the electronic device 502 acquires response instructions, for example, by receiving them from the mobile device 506 in response to the user's selection of an appropriate on-screen menu option. Finally, in step 614, the response instructions are executed by the security application on the electronic device 502

The security system of FIG. 5 and the method of FIG. 6 advantageously permit a user to easily set up a portable security system virtually at any mobile object desired to be secured (e.g., a automobile, storage/transport container, or the like). The security system of FIGS. 5-6 advantageously does not require an electronic device (e.g., home automation controller), but may be implemented as an application installed on a mobile phone or tablet computer that can be used in many ways other than a security system.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, embodiments are described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments are essentially the code segments to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, etc. User input may include any combination of a keyboard, mouse, touch screen, voice command input, etc. User input may similarly be used to direct a browser application executing on a user's computing device to one or more network resources, such as web pages, from which computing resources may be accessed.

While the invention has been described in connection with specific examples and various embodiments, it should be readily understood by those skilled in the art that many modifications and adaptations of the embodiments described herein are possible without departure from the spirit and scope of the invention as claimed hereinafter. Thus, it is to be clearly understood that this application is made only by way of example and not as a limitation on the scope of the invention claimed below. The description is intended to cover any variations, uses or adaptation of the invention following, in general, the principles of the invention, and including such departures from the present disclosure as come within the known and customary practice within the art to which the invention pertains.

What is claimed is:

1. A computer-implemented method for automating security of a secured location, the method comprising:
    providing an electronic device at the secured location, the electronic device including an application in communication with at least one sensor adapted to detect at least one trigger event at the secured location;
    providing an application on a mobile device, the application configured to receive an alert from the electronic device at the secured location;
    detecting a trigger event at the secured location;
    comparing a predetermined threshold with a distance between the mobile device and the secured location;
    transmitting, based on the distance exceeding the predetermined threshold, a signal indicating detection of the trigger event from the electronic device at the secured location to the mobile device; and
    providing, via the application on the mobile device, an alert on the mobile device indicating the detection of the trigger event at the secured location.

2. The method of claim 1 wherein the distance is determined using at least one of GPS and cellular positioning.

3. The method of claim 1 wherein the mobile device is at least one of a mobile phone and a tablet.

4. The method of claim 1 wherein the secured location comprises at least one of a house, apartment, condominium, hotel room, commercial building, and office.

5. The method of claim 1 wherein the trigger event comprises a predefined security anomaly.

6. The method of claim 1 wherein the at least one sensor comprises a camera built into the electronic device at the secured location.

7. The method of claim 1 wherein the application of the electronic device is installed on the electronic device and wherein the application of the mobile device is installed on the mobile device.

8. The method of claim 1 wherein the providing, via the application on the mobile device, an alert on the mobile device indicating the detection of the trigger event at the secured location further includes displaying on a screen of the mobile device menu options permitting a user of the mobile device to select at least one of the menu options associated with the trigger event at the secured location.

9. The method of claim 8, further comprising, in response to a user selection of the at least one of the menu options on the screen of the mobile device, sending instructions regarding the trigger event from the mobile device to the electronic device at the secured location.

10. The method of claim 9, further comprising executing the instructions received at the electronic device at the secured location from the mobile device.

11. A computer-implemented method for automating security of a mobile object, the method comprising:
    providing an electronic device at the mobile object, the electronic device including an application in communication with at least one sensor adapted to detect at least one trigger event at the mobile object;
    providing an application on a mobile device, the application configured to receive an alert from the electronic device at the mobile object;
    detecting a trigger event at the mobile object;
    comparing a predetermined threshold with a distance between the mobile device and the mobile object;
    transmitting, based on the distance exceeding the predetermined threshold, a signal indicating detection of the trigger event from the electronic device at the mobile object to the mobile device; and
    providing, via the application on the mobile device, an alert on the mobile device indicating the detection of the trigger event at the mobile object.

12. The method of claim 11 wherein the distance is determined using at least one of GPS and cellular positioning.

13. The method of claim 11 wherein the mobile device is at least one of a mobile phone and a tablet.

14. The method of claim 11 wherein the mobile object comprises at least one of an automobile, storage container, shipping container, and camping site.

15. The method of claim 11 wherein the trigger event comprises a predefined security anomaly.

16. The method of claim 11 wherein the at least one sensor comprises a camera built into the electronic device at the mobile object.

17. The method of claim 11 wherein the application of the electronic device is installed on the electronic device and wherein the application of the mobile device is installed on the mobile device.

18. The method of claim 11 wherein the providing, via the application on the mobile device, an alert on the mobile device indicating the detection of the trigger event at the mobile object further includes displaying on a screen of the mobile device menu options permitting a user of the mobile device to select at least one of the menu options associated with the trigger event at the mobile object.

19. The method of claim 18, further comprising, in response to a user selection of the at least one of the menu options on the screen of the mobile device, sending instructions regarding the trigger event from the mobile device to the electronic device at the mobile object.

20. The method of claim 19, further comprising executing the instructions received at the electronic device at the mobile object from the mobile device.

* * * * *